Nov. 6, 1934.  O. E. ANDRUS  1,979,786

APPARATUS AND METHOD FOR INDICATING DEFECTIVE WELDS

Filed Sept. 18, 1933  2 Sheets-Sheet 1

INVENTOR.
Orrin E. Andrus
BY *Orrin E. Andrus*
ATTORNEY.

Nov. 6, 1934.   O. E. ANDRUS   1,979,786
APPARATUS AND METHOD FOR INDICATING DEFECTIVE WELDS
Filed Sept. 18, 1933   2 Sheets-Sheet 2

INVENTOR.
Orrin E. Andrus
BY
ATTORNEY.

Patented Nov. 6, 1934

1,979,786

UNITED STATES PATENT OFFICE

1,979,786

APPARATUS AND METHOD FOR INDICATING DEFECTIVE WELDS

Orrin E. Andrus, Milwaukee, Wis., assignor to A. O. Smith Corporation, Milwaukee, Wis., a corporation of New York Application September 18, 1933, Serial No. 689,834

10 Claims. (Cl. 219—4)

This invention relates to an apparatus for use in conjunction with electric resistance welding apparatus to indicate those welds which have been imperfectly made.

Electric resistance welding and more particularly electric resistance spot welding has come to be used very generally for the joining of metal parts. In positions, however, where it must be assured that each such joinder, as for instance an electric resistance spot weld, is of a known strength and excellence, considerable difficulty has been experienced. Up to this time no fully satisfactory means has been available to indicate those welds which do not have the desired excellence at the time of their completion. It is often not possible to determine by visual inspection of such a spot weld whether it is perfectly welded or not since the inner welded surfaces may be insufficiently fused together, or in some cases overheated, rendering the joinder imperfect without the exterior surfaces indicating the defect.

This invention has for its object the provision of an apparatus which is simple of operation, and by which those welds which are imperfectly made are indicated at the time of their formation. By the use of this invention, full information is thus provided as to the perfection of a completed welded structure.

In the making of resistance spot welds between two metal parts, it is usual to exert a known pressure upon the juncture between the parts to be united by means of the electrodes provided to supply the heating current to the parts, then pass heating current through the juncture from these electrodes for a definite time period at the termination of which the current is discontinued, and the pressure is maintained for a short additional period until the weld has attained sufficient strength by cooling to prevent its injury by stress between the pieces. It is also usual to connect the electrodes with a source of electric energy supply of essentially constant voltage. The usual source of energy supply is a welding transformer the primary of which is connected to an alternating current source of relatively constant voltage.

At the time of initial passage of current through the parts, they are relatively cold and of corresponding low resistance and a large current flows. As the parts heat, their resistance rises and the current is reduced. These current values are also controlled by the inductance of the welding transformer and its connections to the electrodes, which inductance is generally large and tends to limit the high values of the current.

This invention is based upon the discovery that, in the manufacture of products in large numbers where many similar welds are produced under supposedly identical conditions, those welds in which the varying electrical values such as current, voltage or voltage across the weld have followed substantially the same cycle of values with respect to the elapsed time in the welding operation, are more nearly perfect and that those welds in which these electrical values have substantially deviated from the values in the ideal cycle at any given elapsed time are imperfect. It has been found that in some cases only a portion of the welding cycle is critical and that for instance the energy values may deviate somewhat at the beginning of the welding cycle if the remaining and finishing values substantially correspond to those of the representative cycle.

A more specific object of the invention is to provide an apparatus whereby those welds are indicated in which the cycle of varying electrical values substantially deviates from the values obtained in the making of the representative perfect weld, and more particularly from the values during the critical part of the cycle of welding.

Another object is to provide a method for determining during welding the quality of a weld such as a resistance spot weld in which the weld producing energy has a cycle of variation.

The invention may be better understood by reference to the accompanying drawings, in which.

Figure 1:
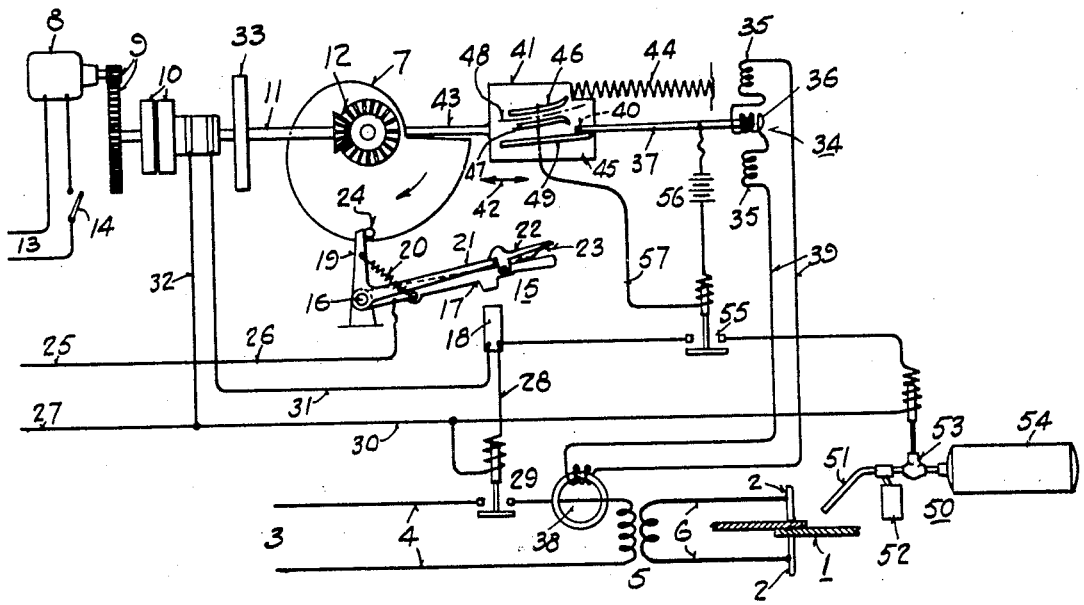
Figure 1 is a diagrammatic view of circuits and apparatus arranged in accordance with the invention for indicating the character of the weld by means of the current delivered.

Referring to the embodiment shown in Fig. 1, a pair of plates 1 are arranged for joining by a resistance spot weld. Spot welding electrodes 2 are provided to supply the welding current and apply the necessary pressure to the plates. The usual current supply system is shown connected to electrodes 2 and consists of an alternating current source 3, a pair of leads 4, a step-down welding transformer 5 and a pair of low tension leads 6 connected to electrodes 2.

A weld is made by exerting pressure on the electrodes, passing current through the electrodes and the joint to be welded for a definite period of time, discontinuing the current flow and later relieving the pressure on the electrodes.

The apparatus of Fig. 1 is constructed and arranged to start the flow of current through the joint, to automatically discontinue said flow at the expiration of a predetermined time and to simultaneously and continuously compare the current input values at the successive time intervals of the welding cycle with the values obtained at corresponding time intervals in a previous representative welding cycle.

This apparatus is also arranged to indicate or mark a weld in which any value of the current input is not substantially the same as the value obtained at the corresponding elapsed time interval in making the representative weld.

To coordinate the above functions with respect to the elapsed time in the welding cycle, there is provided a time indicating cam 7. Cam 7 is shown as driven by motor 8 through gears 9, magnetic clutch 10, shaft 11, and bevel gears 12. Motor 8 is preferably of a constant speed type to insure that the timing of successive welds shall be alike. For this purpose an induction type alternating current motor is connected to a source of alternating current by leads 13 in one of which is inserted a starting switch 14. It is understood that other types of motors may also be employed, for instance an adjustable speed direct current motor whereby the length of the time cycle may be determined by adjusting the motor speed. To adjust the time of one revolution of cam 7 and thereby the period of the welding cycle, with the motor here used, the gears 9 are changed to a pair with a new desired ratio.

The starting and discontinuing of the current through the joint is accomplished by means of the following mechanisms and circuit connections: Switch 15 has pivoted upon pin 16 a contact blade 17 arranged to engage contact 18. Switch 15 is provided with an auxiliary bell crank lever pivoted also upon pin 16. One arm 19 of this bell crank lever is biased toward contact blade 17 by a tension spring 20 insuring that blade 17 and bell crank arm 21 shall return to their relative positions, shown in the drawings, whenever the operator is not controlling this condition. A hand latch 22 biased by spring 23 is provided to lock blade 17 and arm 21 in fixed position.

The cam 7 is provided with a pin 24 which is arranged to engage bell crank arm 19 as the cam revolves in the direction of the arrow during the welding cycle. This cam is represented in Fig. 1 in its stopped position at the termination of the welding cycle. The switch blade 17 is connected with one side 25 of a direct current source through lead 26, and contact 18 is connected to the other side 27 of said current source through lead 28, the coil of a normally open welding current interrupting contactor 29 and lead 30. The closing of switch 15 closes contactor 29 and causes current to pass through the welding joint, and the opening of switch 15 allows contactor 29 to open, interrupting the welding current.

The magnetic clutch 10 is also energized by the closing of switch 15 and deenergized by the opening of this switch. When clutch 10 is energized, the current flows from one side 25 of direct current source, through lead 26, switch 15, lead 31, solenoid of clutch 10, lead 32, and to the other side 27 of the direct current source.

It will be observed that the closing and opening of switch 15 causes cam 7 to start rotating by means of clutch 10 at the time of initial welding current flow and opens clutch 10 at the time of the cessation of the welding current. A fly wheel 33 is provided on shaft 11 to prolong slightly the rotation of cam 7 beyond the time of the opening of clutch 10 for purposes which will be explained in connection with the current comparing part of the apparatus.

That portion of the apparatus of Fig. 1 which is arranged to compare the input welding current to the input current of a previous representative welding cycle is composed essentially of two parts. One part is a current indicating element and its connections. The other part is a contact making movable cam in the form of a current time graph and constructed to represent the values of current in the representative welding cycle for the successive elapsed times in said cycle. The above two parts of the apparatus are arranged to cooperate with each other to indicate any substantial deviation of the input current from the corresponding values in the preferred cycle.

The current indicating part of the apparatus has a current responsive element 34 composed of two stationary coils 35 between which is arranged a pivotally movable coil 36 and an indicating arm 37 attached thereto.

The coils 35 and the coil 36 are connected in series with each other and are also connected in series with the secondary winding of current transformer 38 by means of leads 39. On the outer end of arm 37 is provided a contact making pin 40. Cooperating with this current indicating part of the apparatus is graph plate 41 arranged to reciprocally move in the direction of arrows 42. The plate 41 is attached to cam follower 43 which is caused to follow the contour of cam 7 as the latter revolves. This is accomplished by means of compression spring 44.

The plate 41 has an insulating back 45 upon which are mounted two electro-conductive graph shaped strips 46 and 47. These strips are so arranged as a part of plate 41, that as it is advanced in its time movement by cam 7, the mid-position between the strips at the longitudinal position of contact pin 40 of arm 37 represents the current deflection value of the representative welding cycle for each particular time elapse.

The distance between the plates determines the allowable variation from this center line or ideal current graph which is here represented by dotted line 48.

As the cycle of welding proceeds, if the welding current follows substantially the values of the previous representative welding cycle, pin 40 will move between strips 46 and 47 without touching them. A substantial deviation from the previous current values will, however, cause pin 40 to contact strips 46 or 47 if the current is at any time substantially greater or less respectively than that represented by line 48.

An insulating strip 49 is provided for pin 40 to follow as plate 41 returns to the cycle starting position represented in Fig. 1. Strip 49 is arranged to return pin 40 as nearly as possible to normal full current starting position to minimize the inertia effects of arm 37 as the initial inrush of input current deflects said arm at the start of the welding cycle. It is also desirable to provide pivotal coil 36 with considerable damping. Strips 46 and 47 are flared outwardly at their forward ends allowing greater tolerance for the welding current at the beginning of welding.

The weld marking device 50 is here shown as a paint spraying device comprising a paint spray nozzle 51, paint container 52, solenoid operated air valve 53, and compressed air container 54. The coil of solenoid valve 53 receives its current supply from direct current source 25, 27 through solenoid operated contactor 55 and switch 15. Thus it is only possible to open valve 53 and mark the weld by paint spray when switch 15 is closed. This is the period during which current is caused to flow through the parts being welded. Contactor 55 receives its closing current from battery 56, through lead 57, strip 46 or 47, contact pin 40, and arm 37. A substantial departure of the welding current from the values corresponding to the graph line 48 moves contact pin 40 into contact with strip 46 or 47, closes the circuit to contactor 55, opens air valve 53, and causes the work to be marked with a spray of paint.

Figure 2:
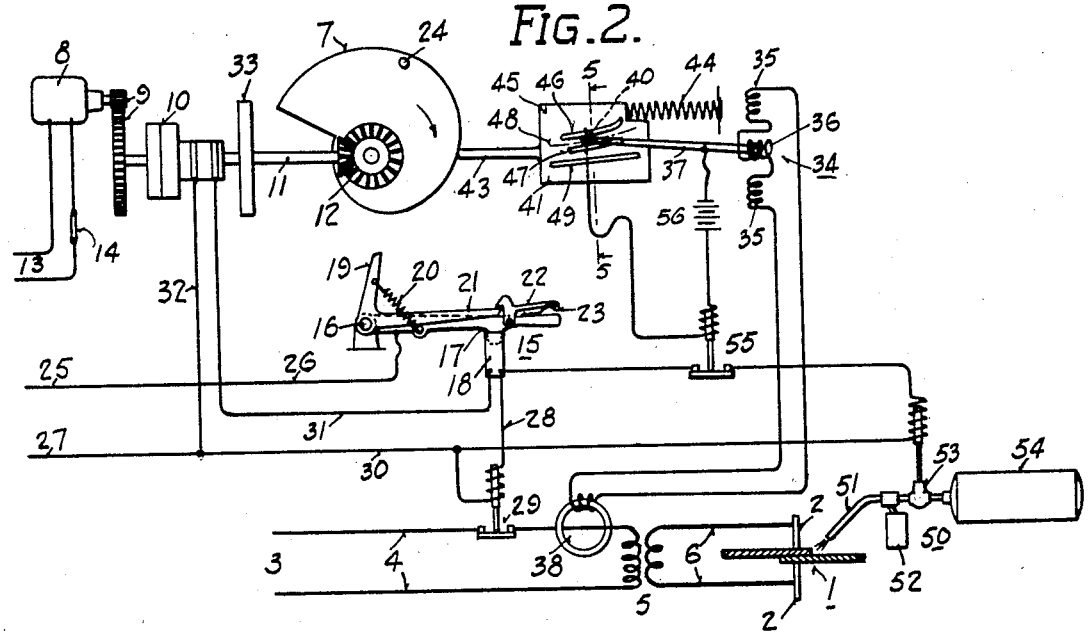
Fig. 2 shows the apparatus of Fig. 1 at an advanced period of the welding cycle.

Fig. 2 is the same as Fig. 1 except that the various parts are shown in the positions they occupy midway of a welding cycle. Pin 40 is represented as displaced from its desired position into contact with strip 46.

The operation of the apparatus above described is as follows. Timing motor 8 is started by closing switch 14. The plates 1 are placed in position for welding. Electrodes 2 are brought in contact with plates 1 under pressure. The operator then releases latch 22 and depresses blade 17 until switch 15 is closed. Magnetic clutch 10 is thereby engaged and cam 7 rotated at a uniform speed. Pin 24 on cam 7 carries bell crank arm 19 forward until it is released from pin 24 and tension spring 20 returns the bell crank until its arm 21 is secured to blade 17 by latch 22 after which the operator removes his hand and the switch 15 remains closed. Simultaneously with closing of switch 15, the welding cycle is started by the automatic closing of solenoid contactor 29.

The circuit of weld marking device 50 is also energized and ready for the operation of the device upon the closing of contactor 55. Arm 37 and contact 40 move upward away from insulating support 49 along line 48. Graph plate 41 then moves to the right as cam 7 rotates and pin 40 passes between conductive strips 46 and 47.

If the welding cycle values are at all times normal, strips 46 and 47 pass to the right of pin 40 without touching it. Pin 24 on cam 7 again engages bell crank arm 19 lifting switch 15, de-energizing clutch 10, the welding circuit and the circuit to the weld marking part of the apparatus. Contact pin 40 drops to its insulating guide strip 49. Fly wheel 33 carries cam 7 forward until cam follower 43 and graph plate 41 are moved to their extreme left position by spring 44 and the apparatus is then in position for a new welding operation. In Fig. 2, pin 40 is shown as having contacted strip 46, closing contactor 55 and thereby opening air valve 53 and marking the work with a spray of paint.

Figure 5:
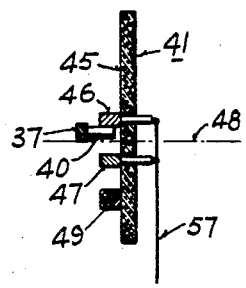
Fig. 5 is an enlarged sectional view of the graph plate taken at line 5—5 of Fig. 2.

In Fig. 5, a section on the line 5—5 through the graph plate 41 of Fig. 2 shows the arrangement of conductive strips 46 and 47, insulating guide strip 49 and backing member 45 with respect to conducting pin 40.

Figure 3:
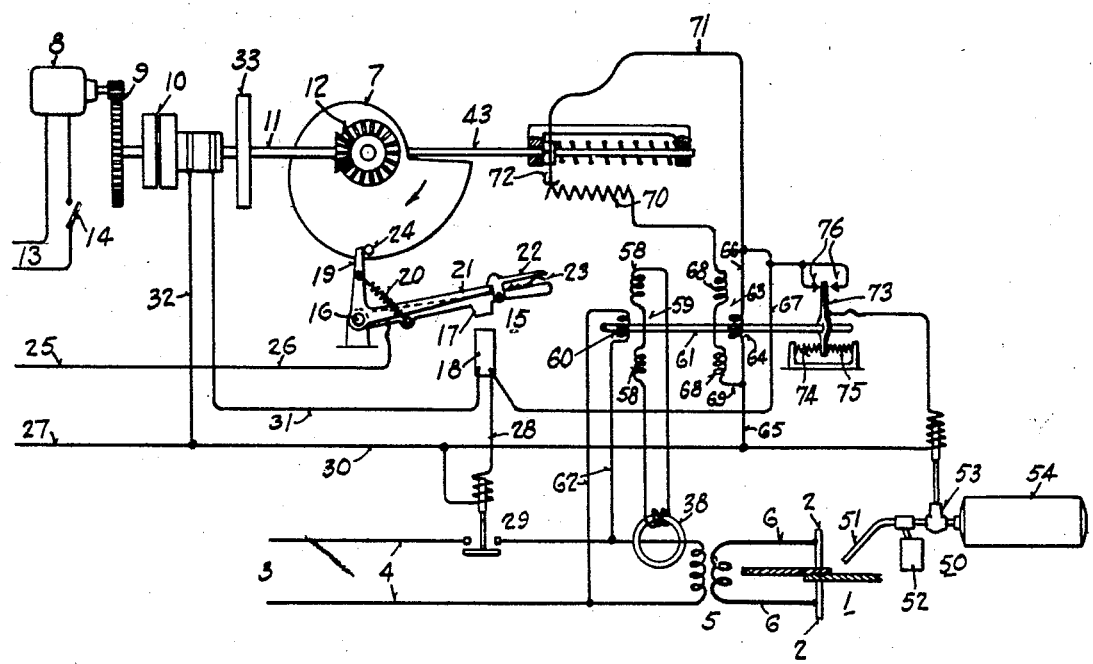
Fig. 3 is a diagrammatic view of another embodiment of the invention in which a watt meter element is coupled with a countertorque element for indicating deviations from the characteristic welding cycle.
Figure 4:
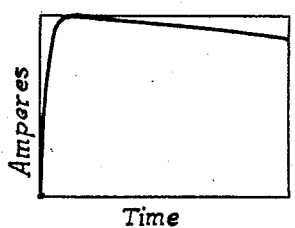
Fig. 4 is a graph of the current values during a characteristic welding cycle.

In Fig. 3 is shown a diagrammatic view of a modified form of the invention. In this embodiment the function of the welding energy employed for purposes of comparison is that of wattage. The current transformer 38 is similar to that used in the form shown in Figs. 1 and 2. Here, however, its secondary is connected in series with the two stationary coils 58 of a torque producing wattage element 59. A voltage coil 60 is mounted on shaft 61, thereby being made pivotal. A coil 60 is connected across the welding current input circuit by leads 62.

Aside from this voltage connection the welding circuit and its connections are the same as in Figs. 1 and 2.

A further modification illustrated in the embodiment of the invention illustrated in Fig. 3 lies in the mode of providing for the comparison with the previous representative weld cycle. A second wattage torque producing element 63 is arranged to produce a torque on shaft 61 in the opposite direction to that produced by element 59. A coil 64 is mounted upon shaft 61 and is connected across the direct current source 27, 25 through leads 65 and 30 and leads 66, 67, switch 15, and lead 26, respectively. Stationary coils 68 are connected in series with each other and to the direct current source. The connection to one side 27 of this source is made through leads 69, 65, and 30. The connection to the other side 25 is made through variable resistance 70, leads 71 and 67, switch 15, and lead 26.

The variable resistance 70 is so proportioned as to reproduce in element 63 the wattage torques of the representative welding cycle as rider 72 is advanced over this resistance by cam follower 43 during the welding cycle. A contact making pointer 73 is attached to shaft 61 and biased to its neutral position by springs 74 and 75.

With no torque in either wattage element 59 or 63, or with the torques exerted by these two elements equal, pointer 73 stands midway between contacts 76. When the torques in elements 59 and 63 are substantially unequal, pointer 73 contacts with one of points 76 and causes current to flow through the coil of the solenoid operated air valve 53, thereby marking the work with a spray of paint. The flow of current is then as follows, from direct current line 25 through switch 15, lead 67, contact 76, pointer 73, the solenoid of valve 53, and line 27 of the direct current source.

The operation of the apparatus shown in Fig. 3 is similar to that described in connection with Figs. 1 and 2 except that the apparatus of Fig. 3 compares wattage values instead of current values and the arrangement is such that a weld indication occurs when two torques become unbalanced and a substantial deflection of a movable indicating element occurs, whereas in the apparatus shown in Figs. 1 and 2, such indication occurs when the deflection of the movable indicating element becomes substantially different than that which occurred in the previous representative welding cycle.

It will be understood that other variations of the apparatus may be made within the scope of the invention as previously described and set forth in the claims which follow.

I claim:

1. An apparatus for use in conjunction with a resistance spot welding equipment for indicating imperfect welds comprising means to indicate the welding current values, means for reproducing the indication values of the current in an acceptable weld cycle, a weld indicating means, a timing means arranged to maintain the successive current indications in continuous relative position to the indications of said second named means to provide automatic comparison of the two said current indications at successive corresponding time positions, and means to cause the weld indicating means to function when a substantial difference exists between the two said current indications.

2. In the making of electric resistance welds such as spot welds, combined means for comparing continuously a function of the input energy at each instant of the welding cycle with the corresponding elapsed time function of a previous representative weld cycle corresponding in welding time relationship, and means to indicate those welds in which said welding energy function substantially deviates from the previous representative values.

3. A defective weld indicating apparatus for use during the time of making an electric resistance weld comprising means for producing a force representative of a function of the welding energy at successive time intervals of the welding cycle, means for reproducing at the successive time intervals a second force representative of the corresponding time values of a similar welding energy function in a previous representative welding cycle, and means operative to indicate the weld in which the said two forces substantially differ in value at a corresponding time in the welding cycle.

4. A defective weld indicating apparatus for use during the time of making an electric resistance weld comprising means for producing indications representative of a function of the welding energy at successive time intervals of the welding cycle, graphical means for reproducing at the successive time intervals a second indication representative of the corresponding time value of a similar welding energy function in a previous representative welding cycle, and means operative to indicate the weld in which the said two indications substantially differ in value at a corresponding time in the welding cycle.

5. In the making of electric resistance welds such as spot welds, combined means for comparing continuously a function of the input energy with the function of a previous representative weld cycle corresponding in welding time relationship, means to indicate those welds in which said welding energy function substantially deviates from the previous representative values, and automatic means for discontinuing the welding energy at the end of a predetermined time interval.

6. An apparatus for use in the making of electric resistance spot welds comprising an electric welding energy supply circuit, means operative to indicate a function of the energy flowing in said circuit, means to represent the successive values of the welding energy function of a previous welding cycle, control means for starting and stopping the flow of the welding energy in the supply circuit, electrically operated defective weld marking means, and timing means arranged to maintain the indications of said two energy function indicating means in corresponding time relationship for automatic comparison, automatically time the flow of welding energy through said control means and simultaneously connect said weld marking means to a source of electrical energy.

7. An apparatus for use in the making of electric resistance spot welds comprising an electric welding energy supply circuit, means operative to indicate a function of the energy flowing in said circuit, means to represent the successive values of the welding energy function of a previous welding cycle, control means for starting and stopping the flow of the welding energy in the supply circuit, electrically operated defective weld marking means, timing means arranged to maintain the indications of said two energy function indicating means in corresponding time relationship for automatic comparison, automatically time the flow of welding energy through said control means and simultaneously connect said weld marking means to a source of electrical energy, and means for actuating said weld marking means when the simultaneous indications of the two energy functions are different at any time during a predetermined period of the welding cycle.

8. The method of determining the quality of a weld such as a resistance spot weld in which the weld producing energy is subject to a cycle of variation comprising continuously producing during the welding cycle indications of a successively varying welding energy function and comparing said indications with similar indications of corresponding time relationship obtained in a representative welding cycle.

9. The method of determining the quality of a weld such as a resistance spot weld in which the weld producing energy is subject to a cycle of variation comprising producing indications of a successively varying welding energy function in a representative welding cycle, and comparing these indications with values of the said energy function occurring at intervals of corresponding time relationship in the production of the weld the quality of which is to be determined.

10. The method of determining the quality of a weld such as a resistance spot weld in which the weld producing energy is subject to a cycle of variation comprising producing indications of a successively varying welding energy function in a representative welding cycle, and comparing a value of said energy function obtained in the production of a weld to the corresponding time relationship indication of said representative welding cycle to determine the quality of said second weld.

ORRIN E. ANDRUS.